United States Patent [19]

Smith

[11] 4,133,548
[45] Jan. 9, 1979

[54] SCOOTER

[76] Inventor: Gerald E. Smith, 1528 Waterhouse St., East Ridge, Tenn. 37412

[21] Appl. No.: 842,117

[22] Filed: Oct. 14, 1977

[51] Int. Cl.² .............................................. B62K 9/00
[52] U.S. Cl. ......................... 280/87.04 R; D34/15 AT
[58] Field of Search ................. 280/87.04 A, 87.04 R, 280/87.05, 11.1 R, 11.1 BT; D34/15 AT, 15 AJ

[56] References Cited

U.S. PATENT DOCUMENTS

| 2,253,012 | 8/1941 | Benner et al. | 280/11.1 BT |
| 3,751,062 | 8/1973 | White | 280/87.05 |
| 3,795,409 | 3/1974 | Cudmore | 280/87.04 A |

OTHER PUBLICATIONS

Wheeleeboard, "Skateboarder" Magazine, Sep. 1977.

Primary Examiner—John A. Pekar
Attorney, Agent, or Firm—Lamont Johnston

[57] ABSTRACT

A scooter for performing riding tricks thereon, consisting of a generally concave riding platform having an interior platform surface. The scooter has a holding means attached to at least one end of the platform for a person, who is supported by the platform and riding the scooter, to hold onto. The scooter additionally consists of a plurality of roller means attached to the exterior surface of the riding platform. The roller means are positioned in such a manner so as to enable the scooter to ride on a riding surface, e.g. the ground, in a plurality of riding positions along the exterior surface. When the person riding the scooter shifts the weight of his body, the scooter shifts from one riding position to another while rolling on the riding surface.

5 Claims, 6 Drawing Figures

SCOOTER

This invention relates to scooters, and more particularly to scooters for performing riding tricks thereon.

There are generally many designs for scooters. Generally, known scooters consist of a horizontal riding platform with a plurality of wheels thereunder, and a holding means projecting perpendicularly therefrom. These known scooters are exemplified by, for example, U.S. Des. Pat. No. 120,019 to Rodriguez and U.S. Des. Pat. No. 187,706 to Jenkins.

The major disadvantage of such scooters is that they are not conducive to performing riding tricks thereon and there is only one riding position.

It is therefore an object of this invention to provide a scooter which allows for the performance of a greater number of riding tricks thereon than the conventional scooter.

It is another object of this invention to provide a scooter which can be ridden in a plurality of riding positions.

The present invention is directed to a scooter for performing riding tricks thereon, consisting of a generally concave riding platform having an interior platform surface and an exterior surface. The scooter has a holding means attached to at least one end of the platform for a person, who is supported by the platform and riding the scooter, to hold onto. The scooter additionally consists of a plurality of roller means attached to the exterior surface of the riding platform. The roller means are positioned in such a manner so as to enable the scooter to ride on a riding surface, e.g. the ground, in a plurality of riding positions along the exterior surface. When the person riding the scooter shifts the weight of his body, the scooter shifts from one riding position to another while rolling on the riding surface.

There are other objects, advantages and features of the invention that will become more apparent from the following specification when taken in connection with the accompanying drawings, where like reference numerals refer to like parts throughout:

Figure 1:
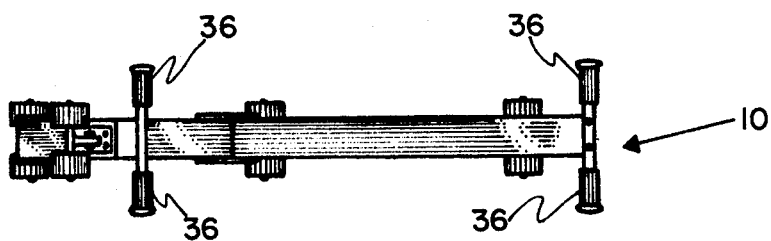
FIG. 1 is a top plan view of an embodiment of a scooter of this invention.
Figure 2:
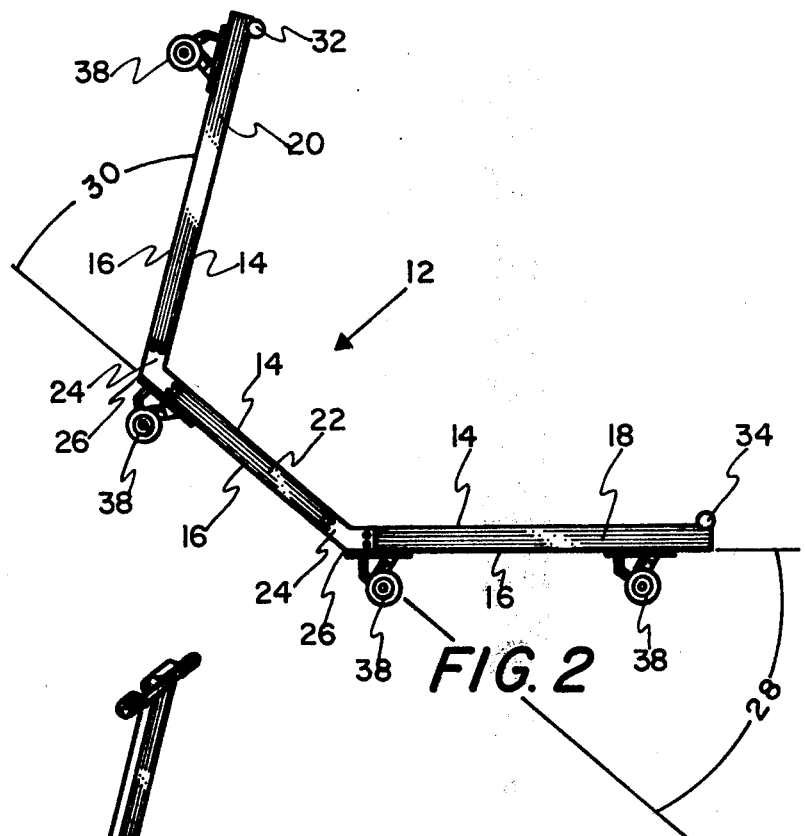
FIG. 2 is a front elevation view of the embodiment of the scooter depicted in FIG. 1.
Figure 3:
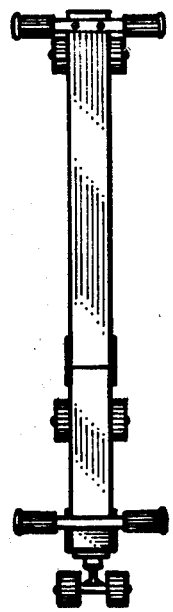
FIG. 3 is a side elevation view of the embodiment of the scooter depicted in FIGS. 1 and 2.

Referring to FIGS. 1 through 6, which depict only one embodiment of this invention, the scooter is generally designated as 10. The scooter 10 is comprised of a generally concave riding platform 12 having an interior platform surface 14 and an exterior surface 16.

By the use of the term "generally concave riding platform" it is meant a riding platform designed to support a person which generally curves upward toward the person riding on the platform. The term "generally concave" is meant to include a smooth curvilinear concave platform, e.g. a portion of a cylinder or circle, and a platform (as depicted in FIGS. 1 through 6) constructed of a plurality of straight, elongated platform beams.

In the embodiment depicted, the riding platform 12 consists of three elongated platform beams 18, 20, 22 joined together end to end. This invention contemplates the use of a greater number of elongated platform beams, but three are preferred.

The beams 18, 20, 22 are joined together at their ends by a brace 24 to form the juncture 26 of the platform beams 18, 20, 22. The beams, may however be joined together by any means and may also be formed from one piece of material, e.g. plastic, which is molded or bent to form the plurality of platform beams.

In the embodiment depicted the three platform beams consist of a center beam 22 and two end beams 18, 20. Preferably, the center beam 22 is attached to each of the two end beams 18, 20 at an angle 28, 30 from about 15° to about 75° from the exterior surface 16 of the center beam 22. It is more particularly preferred that one of the end beams 18 is attached to the center beam 22 at an angle 28 of about 40° and the other end beam 20 at an angle 30 of about 60°.

Generally speaking, the degree of curvature of the riding platform 12, or as depicted, the angles 28, 30 formed between the platform beams, is not critical as long as the riding platform 12 can contain and support a person riding the scooter 10, be it standing, crouching or sitting; and the scooter 10 can shift to the plurality of riding positions easily and comparatively safely. As one can appreciate, the optimum degree of curvature of the riding platform is dependent on the number of platform beams utilized, the number of roller means, the riding position of the person utilizing the scooter, and the degree of skill of the rider in utilizing the scooter.

The riding platform 12 should be of sufficient width to support, a person. Preferably the width is at least the width of the foot of the person riding the scooter. This invention however, envisions a riding platform somewhat wider, to perhaps support two persons riding thereon.

The scooter 10 is further comprised of a holding means 32, 34 attached to at least one end of the platform 12 for a person, who is supported by the platform 12 and riding the scooter 10, to hold onto. Preferably there is a holding means 32, 34 attached to each end of the platform 12. The attachment of two holding means allows a person to ride the scooter in two different directions without turning the scooter around, allows the person to straddle the platform 12 while riding the scooter, and generally permits a greater number of riding tricks to be performed safely.

Typically, the holding means 32, 34 are handles having friction grips 36 thereon, made of rubber, plastic etc. The holding means, however, may be of any type which perform their intended function.

A plurality of roller means 38 are attached to the exterior surface 16 of the riding platform 12. The roller means 38 enable the scooter 10 to roll on a riding surface 40 in a plurality of riding positions. The roller means are typically wheels, well known in the art, which are used on roller skates, skateboards and the like.

Preferably, the roller means 38 are wheels constructed of resilient or yieldable material to cushion the contact shock of the wheels engaging the riding surface 40.

In the embodiment depicted, the roller means 38 are attached substantially near the junctures 26 of the platform beams 18, 20, 22 and substantially near each end of the riding platform 12. This permits a comparatively smooth transition from one riding position to another by having a roller means, i.e. a set of wheels, always in contact with the riding surface 40 while shifting riding positions.

Figure 4:
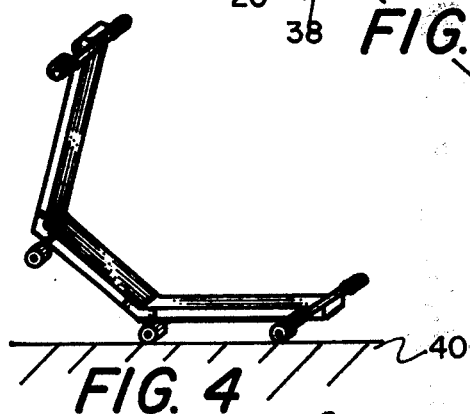
FIG. 4 is a perspective view of the embodiment of the scooter depicted in FIGS. 1 through 3 in a first riding position.
Figure 5:
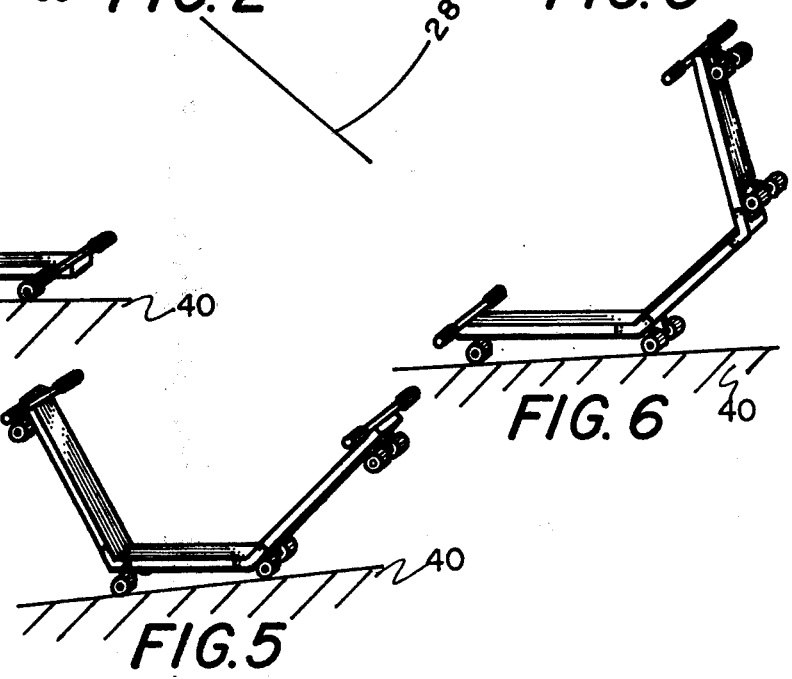
FIG. 5 is a perspective view of the embodiment of the scooter depicted in FIGS. 1 through 3 in a second riding position.
Figure 6:
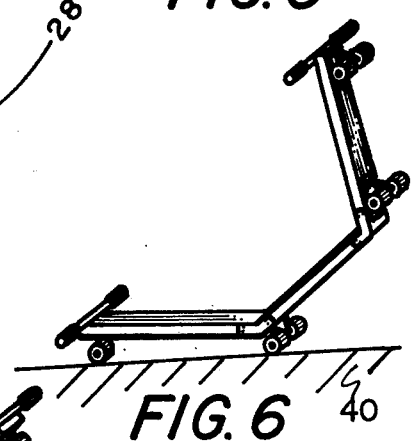
FIG. 6 is a perspective view of the embodiment depicted in FIGS. 1 through 3 in a third riding position.

In the embodiment depicted there are three riding positions of the scooter 10, as shown in FIGS. 4, 5 and 6. As a general proposition, the number of riding positions are equal to the number of platform beams utilized to form the concave riding platform. In the extreme, i.e. an infinite number of platform beams, creating a smooth curvilinear, cylindrical or spherical riding platform, 12 there are an infinite number of riding positions. This assumes, however, that there are an infinite number of roller means 38. The number of riding positions of such a riding platform 12 however, will probably be limited by the number of roller means utilized.

To use the scooter 10 of this invention, one places one foot on the riding platform 12 and pushes the scooter with the other foot. While the scooter 10 is riding on the riding surface 40 the person riding the scooter shifts the weight of his body thereby causing the scooter to shift from one riding position to another. Various other riding tricks may be performed in conjunction therewith.

The scooter may be easily made of available materials and sold at reasonable prices. The construction and arrangement of the parts may be varied within the scope of equivalent limits without departure from the nature and principle of the invention.

What is claimed is:

1. A scooter comprising:
   (a) a riding platform comprising a plurality of planar surfaces connected with each other's ends at angles and forming interior and exterior platform surfaces;
   (b) a holding means attached to at least one end of the platform for a person, who is supported by the platform and riding the scooter, to hold onto; and
   (c) a plurality of roller means attached to the exterior near the ends of the planar surfaces for enabling the scooter to roll on a riding surface in a plurality of riding positions along the exterior surface,
   whereby when the person riding the scooter shifts the weight of his body, the scooter shifts from one riding position to another while rolling on the riding surface.

2. The scooter of claim 1, wherein the riding platform consists of at least three elongated platform beams joined together end to end.

3. The scooter of claim 2, wherein the center beam is attached to each of the two end beams at an angle of from about 15° to about 75° from the exterior surface of the center beam.

4. The scooter of claim 3, wherein one of the end beams is attached to the center beam at an angle of about 40° and the other beam at an angle of about 60°.

5. The scooter of claim 2, wherein the platform beams are of a width of at least the width of the foot of a person.

* * * * *